United States Patent
Chevalier et al.

[11] Patent Number: 6,129,867
[45] Date of Patent: Oct. 10, 2000

[54] METHOD FOR MANUFACTURING ALVEOLATE CELLULOSED PRODUCTS

[75] Inventors: Christophe Chevalier, Beauvais; Henri Chanzy, La Tronche; Jean-Luc Wertz, Beauvais, all of France

[73] Assignee: Financiere Elysees Balzac, Paris, France

[21] Appl. No.: 09/147,228

[22] PCT Filed: May 6, 1997

[86] PCT No.: PCT/FR97/00796

§ 371 Date: Nov. 4, 1998

§ 102(e) Date: Nov. 4, 1998

[87] PCT Pub. No.: WO97/42259

PCT Pub. Date: Nov. 13, 1997

[30] Foreign Application Priority Data

May 6, 1996 [FR] France .................................. 96 05616

[51] Int. Cl.[7] .................................................. B29C 67/20
[52] U.S. Cl. ............................ 264/28; 264/45.3; 264/49; 264/54
[58] Field of Search .................................. 264/28, 49, 54, 264/45.3

[56] References Cited

U.S. PATENT DOCUMENTS

| | | | |
|---|---|---|---|
| 1,142,619 | 6/1915 | Pum et al. ................................ | 264/49 |
| 3,382,303 | 5/1968 | Stieg ......................................... | 264/49 |
| 3,412,184 | 11/1968 | Sharples et al. ........................... | 264/49 |
| 3,432,585 | 3/1969 | Watson et al. ............................. | 264/49 |
| 3,476,844 | 11/1969 | Villain ....................................... | 264/49 |
| 3,527,853 | 9/1970 | Rowley et al. ............................. | 264/49 |
| 3,546,209 | 12/1970 | Lipps, Jr. ................................... | 264/49 |
| 3,607,692 | 9/1971 | Ludwigshafen ........................... | 264/28 |
| 4,041,115 | 8/1977 | Jenkins et al. ............................. | 264/28 |
| 4,062,782 | 12/1977 | Kunst et al. ............................... | 264/49 |
| 4,173,613 | 11/1979 | Rodier ....................................... | 264/187 |
| 4,232,128 | 11/1980 | Wolfgang et al. . | |
| 5,906,780 | 5/1999 | Hausdorf et al. .......................... | 264/49 |
| 5,910,275 | 6/1999 | Hausdorf et al. .......................... | 264/49 |
| 6,007,750 | 12/1999 | Firgo et al. ............................... | 264/344 |

FOREIGN PATENT DOCUMENTS

| | | |
|---|---|---|
| 0 670 344 | 9/1995 | European Pat. Off. . |
| 260 187 | 9/1988 | German Dem. Rep. . |
| 260 190 | 9/1988 | German Dem. Rep. . |
| 01-188 539 | 7/1989 | Japan . |
| 1 390 061 | 4/1975 | United Kingdom . |
| WO97/23552 A1 | 7/1997 | WIPO . |

Primary Examiner—Allan R. Kuhns
Attorney, Agent, or Firm—Bacon & Thomas

[57] ABSTRACT

The present invention provides a process for producing alveolar cellulosic products (sponges, sponge-cloths, etc.) from a cellulosic raw material, the process comprising:
at least partially dissolving a cellulosic raw material in an intrinsic solvent for cellulose;
incorporating an effective quantity of at least one pore-forming agent into the resulting mixture, with mixing; said pore-forming agent(s), being compatible with the cellulosic mixture, being capable of generating macro- and micro-pores when it/they is/are actuated;
gelling the homogeneous dough thus obtained;
treating said gelled dough under conditions in which the cellulose precipitates out and the pore-forming agent(s) present are actuated.

The process is an advantageous alternative to the viscose process which is a polluting process. The properties of the products obtained are completely similar to those of products obtained using the viscose process. The (novel) products form part of the invention.

16 Claims, 2 Drawing Sheets

FIG_1

FIG_2

FIG_3

METHOD FOR MANUFACTURING ALVEOLATE CELLULOSED PRODUCTS

The present invention relates to a novel process for preparing alveolar cellulosic products. It also relates to alveolar cellulosic products which can be obtained from said process.

Alveolar cellulosic products are sponge or sponge-cloth type artificial products; i.e., consisting of sponges, sponge-cloths, foamed sponges or the like. Such materials can be used alone or integrated into a composite structure for hygiene and cleaning purposes, in particular for domestic cleaning. The expression "sponge-cloth" means an alveolar cellulosic material with two substantially parallel faces and of small thickness, generally less than one centimeter. Such a material may comprise a reinforcing scrim in its structure.

To date, such alveolar cellulosic materials have been produced by a process known as the viscose process which is known to the skilled person and has been described in French patent FR-A-812 502. That process comprises:
preparing a dough from:
1) a cellulosic solution such as viscose (the viscose being obtained by the action of an alkaline solution on the basic cellulosic dough; the cellulosic dough is thus transformed into alkali-cellulose, which reacts with carbon disulfide to form a cellulose xanthate which is soluble in soda-containing water);
2) fibrous material such as cotton, sisal, or linen to increase the mechanical strength of the finished product;
3) pigments to color the finished product;
4) pore-forming agents such as Glauber's salt (sodium sulfate decahydrate), soluble and/or fusible crystalline materials which form pores after coagulating the dough by digestion and/or fusion;
forming the dough, in particular by molding or coating both sides or one side of at least one scrim or depositing onto a carrier strip;
heating, optionally in a suitable medium, to cause the pore-forming agents to act and to regenerate the cellulose. Heating can be either by passing an alternating electrical current between electrodes in contact with the dough, or by bringing the dough into contact with an acidic medium (pH less than 1) at temperatures close to 70° C. for a few minutes (acid regeneration, which advantageously employs a mixture of sulfuric acid and sodium sulfate, to produce sponge-cloths), or bringing the dough into contact with a basic medium (pH close to 12) at temperatures close to 100° C. for a few hours (basic regeneration, which advantageously employs a basic sodium sulfate solution, to produce sponges).

In the conventional process, the products obtained—alveolar cellulosic materials—are then rinsed, optionally bleached, dried, and plasticized before being cut and packaged.

That process is based on chemical modification of the cellulose in the cellulosic raw material. (The cellulose, firstly transformed into alkali-cellulose, reacts with carbon disulfide to produce cellulose xanthate which is soluble in the medium). The modified cellulose (transformed into one of its derivatives) must be regenerated at the end of the process. Such chemical modification of cellulose uses carbon disulfide. Carbon disulfide is a pollutant per se. Further, it is the cause of the appearance of by-products which are also pollutants: sulfides, polysulfides and thiosulfates in aqueous solution; hydrogen sulfide as a gas.

Thus carrying out the viscose process causes:
pollution of water by reducing sulfur-containing compounds which result in a high chemical oxygen demand (COD);
atmospheric pollution composed of carbon disulfide, which falls into in the category of volatile organic compounds (VOC), and hydrogen sulfide which is malodorous in very low concentrations and obviously is a nuisance in the surrounding area.

A great deal of research has been carried out to reduce or overcome those disadvantages. Work on optimizing and improving the viscose process has been carried out with a view to minimizing the quantity of carbon disulfide used. Thus in a nearby field, that of producing cellulosic fibers by spinning viscose, the most advanced companies currently prepare viscose with about 28% of carbon disulfide with respect to the alpha-cellulose used. Simultaneously, discharge treatment technologies have been developed. The most sophisticated technologies currently enable all of the pollutants in the aqueous phase to be recycled and no polluted water is discharged into the natural surroundings. Gas treatment technologies can recycle up to 70% of the carbon disulfide used to produce viscose by adsorption on activated charcoal and can convert two thirds of the residual emissions to sulfuric acid by catalytic oxidation. Sulfuric acid is itself used in the process. Atmospheric discharges can thus currently be limited to about 10% of the carbon disulfide used (the discharges are constituted partly by $CS_2$ and partly by $H_2S$). However, the techniques used to overcome the pollution problems are expensive and endanger the economic viability of the viscose process. For this reason, research has been carried out since the 1970s to develop a novel cellulose transforming process which does not have the same environmental disadvantages as the viscose process.

Research has been particularly directed towards processes which do not involve the chemical modification of cellulose, which involve an intrinsic solvent for the cellulose, which thus avoid transforming the cellulose into one of its derivatives (directly soluble) and regenerating that cellulose from that derivative.

A number of solvents or solvent systems for cellulose have been discovered or developed and are now known:
oxides of amines such as N-methyl morpholine N-oxide (NMMO);
complexes containing a metal ion such as Cadoxen (cadmiumlethylene/sodium hydroxide);
dimethylsulfoxide (DMSO);
aqueous zinc chloride solutions;
mixtures based on aqueous lithium chloride solutions;
aqueous solutions of sodium hydroxide or other alkaline hydroxides.

Research directed towards applications for the cellulosic solutions obtained have up until now been principally directed to the production of artificial cellulosic fibers.

Thus Asahi has studied the use of aqueous sodium hydroxide solutions in depth (European patent EP-A-0 147 634), in particular for fiber production. That solvent has the clear advantage of being both cheaper and non toxic. However:
aqueous sodium hydroxide solutions do not constitute a very good solvent for cellulose and in order to obtain the desired dissolution, it has proved necessary to pre-treat the cellulosic raw material to activate it, for example by steam explosion;
the cellulosic solutions obtained generally remain turbid and tend to gel. They are thus difficult to spin.

Only fiber production from solutions of cellulose in NMMO has currently been completely mastered, in particular by Courtaulds who market the fibers produced under the trade mark Tencel®.

Solvents or solvent systems other than NMMO have thus been developed to a greater or lesser extent but none have so far resulted in industrial applications. Some of the solvents (or solvent systems) have quickly been abandoned because of cost and/or toxicity of the solvent itself.

To the knowledge of the Applicant, no company has currently mastered an industrial process for producing alveolar cellulosic products based on directly dissolving cellulose in an intrinsic solvent thereof. The particular demands of such production differ from those required to produce artificial cellulosic fibers. Thus since the cellulosic solution does not have to be passed through a die, demands as regards quality and homogeneity of the cellulosic solution are at first sight much less demanding. However, because a three-dimensional product with a particular pore structure, which has certain mechanical properties, is to be produced a multitude of problems arise.

The pore structure of alveolar cellulosic materials is particular and somewhat complex, because in order to endow the alveolar cellulosic materials with their remarkable hydrophilic and water absorption properties, they have both macro—and micropores. The macropores—pores with a size of over 100 μm—enable such materials to absorb large quantities of liquid (up to 30 times their dry weight). The micropores—pores with a size below 10 μm—play a number of roles:

they enable liquid to penetrate into the structure to enable the dry material to be wetted very rapidly;
they enable liquid to circulate between the macropores, thus enabling the macropores to empty and fill;
they act as sealing valves between the macropores, enabling liquid to be retained in the macropores when the material is not compressed and thus the macropores can be used to transport that liquid.

In the viscose process, such a pore structure results from the specific action of pore-forming agents such as Glauber's salt. On melting, Glauber's salt creates macropores with dimensions equal to those of the crystals introduced. It also acts as a viscose coagulating agent, to form a gel of cellulose xanthate swollen by sodium hydroxide. The structure of that gel foreshadows the microporous structure of the finished products. The release of carbon disulfide in gas form on regenerating the cellulose finishes the microporous structure formation by opening the pore network.

The Applicant has thus applied itself to developing a non polluting process (which does not employ a reactant such as $CS_2$ to transform cellulose into one of its derivatives) which results in alveolar cellulosic products with properties which are entirely similar to those of prior art alveolar cellulosic products obtained using the viscose process.

The process constitutes the first objective of the invention as claimed.

The process is characterized in that it comprises:
at least partially dissolving a cellulosic raw material in an intrinsic solvent for cellulose;
incorporating an effective quantity of at least one pore-forming agent into the resulting mixture, with mixing; said pore-forming agent(s), which is/are compatible with the cellulosic mixture, being capable of generating macro- and micropores when it/they is/are actuated;
gelling the homogeneous dough thus obtained;
treating said gelled dough under conditions in which the dissolved cellulose precipitates out and the pore-forming agent(s) present are actuated.

Details of each of the steps defined above will now be given. Advantageous implementations will be described in more detail.

Since it is not necessary in the process of the invention to completely dissolve the cellulosic raw material (the cellulosic raw material/solvent mixture may consist of a solution but generally consists of a suspension), the nature of said cellulosic raw material is not particularly critical. When carrying out the process on an industrial scale, said cellulosic raw material includes cellulose with a type I and/or type II cellulose crystalline structure. The degree of crystallinity is not important. Advantageously, said cellulosic raw material comprises cellulose with an average degree of polymerization of more than 100, determined by measuring the viscosity of a solution of the cellulosic raw material in cupriethylenediamine; more advantageously, said degree of polymerization is in the range 200 to 1000. If the degree of polymerization of the cellulose is below 200, difficulties in obtaining good quality final products may be encountered; if said degree of polymerization for the cellulose is more than 1000, difficulties in dissolving a sufficient quantity of that cellulose may be encountered.

Examples of cellulosic materials which can be used as cellulosic raw materials for the purposes of carrying out the process of the invention are:
wood pulp: from paper making, or dissolving wood pulp;
recycled paper;
cotton linters;
natural cellulosic fibers such as cotton, linen, hemp, jute, ramie;
cellulose from plant waste, in particular that extracted from the parenchyma of the pulp from certain plants (for example beet and citrus fruits) or that extracted from cereal stalks (such as wheat, barley, rye or rice);
cellulose which has already been transformed (cellulose II) in particular artificial cellulosic fibers (such as viscose fibers, Fibranne®, Tencel®) or regenerated cellulose articles (such as cellulosic sleeves, Cellophane® films or sponges). Carrying out the process of the invention using this type of product thus recycles those products.

The process of the invention can be carried out using cellulosic raw material as it is or following pre-treatment aimed at rendering the supra-molecular crystalline structure of the cellulose more readily accessible to the solvent, to facilitate dissolution in said solvent.

Such pre-treatment has been shown to be completely superfluous with certain cellulosic raw material—solvent pairs and quite generally when NMMO is used as the solvent or when the cellulose has a cellulose II crystalline structure or the cellulose is extracted from the parenchyma of the pulp of certain plants (for example beets, citrus fruits, etc.). In contrast, such a pre-treatment may prove to be indispensable or highly advantageous with other cellulosic raw material/ solvent pairs and quite generally when aqueous sodium hydroxide solutions are used as the solvent with the majority of the cellulose having a cellulose I type crystalline structure, in particular wood pulp, cotton linters or natural cellulosic fibers.

The skilled person will be able to judge when such a pre-treatment is necessary (to obtain a satisfactory degree of dissolution without deleteriously affecting the mechanical properties of the final product as a result) and will know how to carry out such an operation. Such treatment for cellulosic raw material has been described in other contexts. Such treatments are termed activation treatments. In particular, one or the other of the following techniques can be carried out:

a) Steam explosion
This activation process has in particular been described by Asahi in patent application EP-A-0 147 634. It consists in:

impregnating the cellulose with an agent which facilitates the rupture of intra-molecular hydrogen bonds (for example, water, an aqueous solution of a salt, an aqueous acid solution, an aqueous basic solution . . . ) in a proportion of 10% to 1000% by weight with respect to the dry cellulose;

heating the ensemble to a temperature in the range 100° C. to 350° C. at a pressure in the range 10 to 250 atmospheres (about 106 Pa to $25 \times 10^6$ Pa) (the pressure selected can, for example, correspond to the saturated vapor pressure of the water at the temperature under consideration) for a period of 20 seconds to 20 minutes;

suddenly depressurizing the mass back to atmospheric pressure and room temperature.

b) Microfibrillation

This activation process is based on the cellulose refining techniques used in the paper industry. It consists of:

mixing the cellulosic raw material with water or with a low concentration sodium hydroxide solution (less than 5% by weight) to obtain a pulp containing 0.1% to 5% of dry cellulose;

grinding the pulp in a Gaulin type homogenizer for a period of 1 to 24 hours.

As indicated above, the activation treatments facilitate dissolution of the cellulose in the solvent. The treatments reduce the length and diameter of the fibers of the cellulose structure and reduce the average degree of polymerization. They thus have an influence on the mechanical properties of the final product.

As indicated above, the skilled person will be able to determine when to carry the treatments out knowing that in the process of the invention, complete dissolution of the cellulosic raw material in the solvent is not the general aim. The preparation of a perfect solution is in general not the aim, although such a solution is not excluded from the scope of the invention. At the end of the first principal step of the process of the invention, a cellulosic raw material/solvent mixture (suspension) is generally obtained; said cellulosic raw material is partly dissolved in said solvent. Such a mixture is generally used as it is in the remainder of the process of the invention, without separating the dissolved fraction from the undissolved fraction. The general aim is to dissolve at least 30% by weight of the cellulosic raw material introduced into the solvent, advantageously at least 50% by weight; the cellulosic raw material having generally been introduced in an amount of 3% to 15% by weight with respect to the weight of solvent.

Within the context of the description of the first dissolution step of the process of the invention, the nature of the cellulosic raw material which can be used has already been described (it should be noted here that for all general purposes, mixtures of materials of different types can clearly be suitable) and the advantageous degree of dissolution required has been given. Some information regarding the solvents which are suitable for use in the process of the invention will now be provided.

All chemical compounds which are known to be solvents for cellulose are suitable a priori for use in the process of the invention. However, it should be understood that a selection can rapidly be made having regard to costs, toxicity, the operating conditions under which they dissolve cellulose, their service costs . . . .

To date, the Applicant advantageously uses aqueous solutions of strong alkaline base(s), more advantageously sodium hydroxide solutions. In order to carry out such advantageous variations of the process of the invention, the Applicant recommends using said strong alkaline bases in aqueous solution at a concentration in the range 5% to 12% by weight. More precisely, the Applicant recommends the use of aqueous lithium hydroxide solutions with a concentration in the range 5% to 8% and the use of aqueous sodium hydroxide solutions with a concentration in the range 7% to 10% by weight.

Such aqueous sodium hydroxide solutions are known to be solvents for cellulose under the given temperature conditions: between about −15° C. and +10° C. The literature contains a great deal of data regarding cellulose-sodium hydroxide-water tertiary systems. Reference should in particular be made to Z. physikal. Chem. Abt B Bd. 43, Heft 5, pp 309–328: "Das System Cellulose—Natriumhydroxyd-Wasser in Abhängigkeit von der Temperature".

In accordance with the invention, dissolution occurs in such solutions between −15° C. and +10° C., preferably between −10° C. and 0° C.

A preferred implementation of the first dissolution step of the process of the invention will now be described by way of illustration:

an aqueous sodium hydroxide solution is prepared containing 7% to 10% by weight of sodium hydroxide, preferably 8% to 9% by weight;

the cellulosic raw material is preferably coarsely ground using a shredder;

the cellulosic raw material can be incorporated into the cooled aqueous sodium hydroxide solution or it can be incorporated into the aqueous sodium hydroxide solution at room temperature. In the latter case—the preferred variation—the mass is then cooled;

dissolution is carried out at a temperature in the range −10° C. to 0° C.;

3% to 15% by weight, advantageously 5% to 9% by weight, of cellulosic raw material with respect to the weight of aqueous sodium hydroxide solution is introduced into the solvent;

the mixture of cellulose and aqueous sodium hydroxide solution is stirred at the recommended temperature for a period of 30 minutes to 8 hours;

a vertical propeller mixer is used for mixing. However, for cellulose concentrations of over 7%, a blender suitable for high viscosity mixtures is preferably used, such as a Z blade blender.

This procedure produces a cellulosic mixture which comprises a fraction of cellulose dissolved in the aqueous sodium hydroxide solution and an undissolved cellulose fraction. Said mixture is used in the remainder of the procedure without separating the undissolved fraction from the dissolved fraction.

(The solubility of the cellulose can be measured as follows:

the cellulosic solution is diluted with an aqueous sodium hydroxide solution of the same concentration as that used to dissolve the cellulose; this dilution is carried out at room temperature. Dilution can drop the cellulose concentration to about 1%;

the solution obtained is centrifuged at 10,000 rpm for 5 minutes;

the supernatant solution containing the dissolved fraction is then separated from the residue which contains the undissolved cellulose fraction.)

In general, it is always possible to include additives in the cellulosic raw material/solvent mixture (of greater or lesser viscosity) to facilitate dissolution of the cellulose. Advantageously, 0.5% to 5% by weight of zinc oxide can thus be added to the aqueous sodium hydroxide solution used as the solvent.

From own knowledge and the information given above, the skilled person will know how to optimize the respective nature and quantities of cellulosic raw material and solvent to use to obtain a mixture (solution or suspension) in which the pore-forming agents will be caused to react in characterizing fashion.

The Applicant has succeeded, in a manner which is in no way obvious, in mastering the use of such pore-forming agents in cellulosic mixtures, other than viscose, in which $CS_2$ is not released.

The use of pore-forming agents constitutes the second principal step of the process of the invention. The pore-forming agents are added to the cellulosic raw material/solvent mixture with mixing to generate a homogeneous dough. As will be described below, other ingredients can also be employed in the dough composition.

As already described, said pore-forming agents are intended to create the particular pore structure of the finished product which endows that product with its hydrophilic and liquid (water) absorption properties etc.

The pore-forming agents used must thus be able to generate macro- and micropores in the structure of the finished products (during precipitation of the dissolved cellulose). They must also, of course, be compatible with the cellulosic mixture to which they are added: they must be able to be added to the mixture in an effective quantity without causing subsequent coagulation or precipitation of the dissolved cellulose.

To carry out the process of the invention, it is recommended that at least one type of pore-forming agent is used, and generally a plurality of types of pore-forming agents. In the latter case, a pore-forming agent known as the principal pore-forming agent, which is principally responsible for the macropores, is generally combined with at least one pore-forming agent known as the auxiliary pore-forming agent, principally responsible for the micropores.

It is, however, possible to use a single type of pore-forming agent or a pore-forming agent formulation of a type different to that defined above.

Suitable pore-forming agent formulations for use in the process of the invention can in particular comprise:
solids which can melt, sublime, or dissolve;
solids or liquids which can release a gas;
anionic or cationic polyelectrolytes which can cause segregation;
swelling agents which can cause foaming.

The action of the pore-forming agents depends, of course, on their nature, the conditions of use and the subsequent process conditions.

It is particularly recommended when carrying out the process of the invention that the following pore-forming agents be used:
a) at least one solid, in the form of particles with a granulometry in the range 10 $\mu$m to 50 mm, advantageously in the range 100 $\mu$m to 15 mm; a solid which is actuated by fusion, sublimation, dissolution or chemical decomposition. The quantity of this type of agent to be used must be calculated on the basis of the total quantity of cellulose contained in the cellulosic mixture (dissolved and undissolved cellulose). For 1 part by weight of cellulose, 10 to 100 parts by weight of solid pore-forming agent are generally added, preferably 20 to 80 parts. Examples of such agents are ice and hydrated salts which melt at a temperature of below 90° C. such as Glauber's salt (sodium sulfate decahydrate: $Na_2SO_4$, $10H_2O$) or trisodium phosphate dodecahydrate ($Na_3PO_4$, $12H_2O$);
b) at least one compound selected from:
solids which are soluble in the cellulosic mixture or non soluble therein and thus with a granulometry of less than 100 $\mu$m, and liquids which can liberate a gas during the subsequent steps of the process when the temperature is raised or by the action of a chemical agent (for example an acid). The quantity of this type of agent must be calculated as a function of the volume of gas produced with respect to the quantity of cellulose used. For 100 grams of cellulose, 0.1 moles to 10 moles of pore-forming agent of this type is generally used;
anionic or cationic polyelectrolytes which can cause segregation of the cellulosic mixture from their incorporation or during the subsequent steps of the process, when the temperature is varied. Care is taken to use this type of agent in a neutralized form, as acidic forms are incompatible with the cellulosic mixtures. This type of agent is generally prepared in the form of solutions, in particular aqueous solutions, which are miscible with the cellulosic mixture. The quantity of this type of agent must be calculated with respect to the quantity of cellulosic solution used. However, it greatly depends on the characteristics of the polyelectrolyte, in particular the chain length and the nature and number of ionic charges. In general, between 0.05% and 20% (% by weight) of pore-forming agent of this type with respect to the cellulosic mixture is generally used;
swelling agents which can cause slight foaming of the cellulosic mixture: either by acting alone or in combination with a further pore-forming agent. This category particularly includes anionic, cationic or non ionic surfactants, polyols and products containing an amide function. This type of agent is generally prepared in the form of solutions, in particular aqueous solutions, which are miscible with the cellulosic mixture. The quantity of this type of agents to be used in the process of the invention can be determined as a function of the desired swelling effect. It is difficult to give a general indication. Incorporation of this type of pore-forming agent into the cellulosic solution must cause a slight increase in volume without, however, forming a highly expanded foam.

The pore-forming agent types listed above are particularly effective when they are used with cellulosic raw material/aqueous sodium hydroxide solution cellulosic mixtures.

The Applicant has obtained highly satisfactory results with such mixtures and certain solids of type a) above (solids which can generate macropores and also micropores provided that they are slightly soluble in the cellulosic solution and initiate cellulose coagulation therein), with such mixtures and formulations comprising solids of type a) above and at least one compound of type b).

At the end of the two principal steps of the process of the invention, a homogeneous dough is produced which is based in the cellulosic raw material (at least partially dissolved), solvent and the pore-forming agent(s). As indicated above, this dough may comprise other ingredients. In a preferred variation, the first phases of the process of the invention also comprise incorporating reinforcing fibers and/or additives into the cellulosic raw material/solvent mixture and/or into the cellulosic raw material/solvent/pore-forming agent(s) dough.

Advantageously, the reinforcing fibers improve the mechanical properties of the finished product, as in the viscose process. Any type of fibers can be used:
natural fibers: wood pulp, cotton, linen, ramie, sisal, hemp, jute, fibers extracted from plant waste such as straw, etc.;
artificial fibers: viscose, rayon, Tencel®, cellulose acetate, etc.;

synthetic fibers: polyester, polyamide, polypropylene, etc. . . . .

The length of the reinforcing fibers is generally in the range 0.5 mm to 50 mm, advantageously in the range 1 mm to 20 mm.

When used, the reinforcing fibers are advantageously added to the cellulosic raw material/solvent mixture before incorporating the pore-forming agent(s) to ensure good bonding between said reinforcing fibers and the dissolved cellulose, which latter is to be precipitated subsequently.

It must be remembered that employing such reinforcing fibers is optional. They may be completely superfluous if the cellulosic raw material/solvent mixture already includes a sufficient quantity of undissolved fibers in addition to dissolved cellulose; or if the mixture already includes reinforcing fibers, supplied with the cellulosic raw material, etc . . . .

Other additives may be used when required, in particular additives which, while not playing a particular role in the formation and structure of the finished product, endow that structure with particular properties.

As an example, when carrying out the process of the invention, the following may be incorporated into the cellulosic mixture (or the cellulosic dough):

pigments to color the finished product (alveolar cellulosic material: a sponge, for example);

bactericides or fungicides to protect the finished product against attack by micro-organisms during storage or use;

compounds intended to protect the finished product against degradation caused by detergents, lyes and, in particular, against oxidizing degradation initiated by sodium hypochlorite solutions;

additives intended to prevent dust, dirt or detritus of various types which may come into contact with the product during use from adhering on or in the finished product;

products intended to endow the finished product with greater flexibility when wet and/or dry and, in particular, to prevent it from hardening when dry or when stored for long periods away from water;

compounds endowing the finished product with greater wear resistance, in particular increased tear strength in tension or torsion and/or increased abrasion resistance.

It has been mentioned above that chemical compounds can also be added to facilitate dissolution of the cellulose.

At the end of the two principal steps of the process of the invention—at least partial dissolution of the cellulosic raw material in the solvent, adding pore-forming agent(s) to the mixture obtained—, a paste or dough is obtained which is constituted by:

the mixture: cellulosic raw material/solvent (said mixture possibly consisting of a solution but generally consisting of a suspension);

the pore-forming agent or agents;

optional reinforcing fibers;

optional additives.

This dough is prepared by mixing the ingredients of which it is constituted, with mixing. It has to be homogeneous to result in a finished product with a homogeneous structure.

In general, the homogeneous dough is then formed using different processes which are known in themselves, depending on the desired presentation for the final alveolar cellulosic product.

In particular, the dough can be:

poured or injected into a mold with or without compression;

extruded through a die;

deposited on a support such as a cloth or a scrim either by zigzag extrusion or by coating using rollers, or by any other process.

In accordance with the invention, the dough comprising the solvent, the dissolved cellulose of the cellulosic raw material, possibly the undissolved cellulose of the cellulosic raw material, the pore-forming agent(s) and possibly at least one additive, is gelled. After its preparation, it is not directly treated to precipitate the dissolved cellulose, with conjoint action of the pore-forming agents. Prior to such treatment, it undergoes a type of aging which has proved to be an indispensable step in producing the final product with the required properties. This gelling step constitutes a key point in the process of the invention. As described above, it generally takes place after a step for forming the dough.

Cellulosic solutions are known to have this property of gelling on storage. It has been seen that this causes a problem for spinning them. Gelling is characterized by an increase in the viscosity of solutions until a gel is obtained which, at least for small stresses and small deformations, has the properties of an elastic solid; i.e., when it undergoes such stresses (or deformations), the gel does not flow and regains its initial form when the stress is released. Gelling results from organization of the dissolved cellulose into a structure swelled by solvent.

Such gelling can be obtained under interesting kinetic conditions by reducing or increasing the temperature of the cellulosic solution and/or by adding suitable additives thereto. Such additives can in particular consist of salts or compounds known for their gelling properties. Examples of suitable salts are metal salts such as lithium, sodium, potassium, magnesium, calcium, aluminum, manganese, iron, cobalt, nickel, copper or zinc salts. The salt selected can be used in the form of an aqueous solution or in its crystalline form. The quantity to be used, the temperature and duration of gelling clearly depends on the salt used and also on the desired properties for the gel.

The importance of this gelling phenomenon within the context of carrying out the process of the invention has been demonstrated; it is modified somewhat or perturbed by the presence of pore-forming agents. Its operation has also been optimized as it has an influence on the micropores and on the mechanical properties of the final product.

When using aqueous solutions of a strong alkaline base, in particular sodium hydroxide, as the solvent, it is recommended that gelling be carried out at a temperature in the range −30° C. to +90° C. for a period of one hour to 400 hours. Three advantageous modes of gelling can be used, as follows:

at room temperature, if the dough includes products which can gel it within a reasonable time period. The products can in particular consist of salt type pore-forming agents which partially dissolve in the mass to cause gelling, to initiate its coagulation, and/or gelling agents of known type (cellulose derivatives, xanthane, starch, . . . );

by reducing the temperature to a temperature of below −8° C. It should be noted that the gel formed when the temperature is raised above −8° C. remains stable. In this variation, the following procedure is advantageously carried out: the dough is slowly cooled to about −15° C. and then returned to room temperature;

by raising the temperature to a temperature of above +30° C. The temperature selected must remain below the temperature likely to cause solid type pore-forming agents with coarse granulometry to actuate and must not in any event cause the dissolved cellulose to depolymerize. It should be noted that the gel formed is stable and remains so even when the temperature is dropped below +30° C.

In general, the skilled person will know how to optimize this gelling step, in particular as a function of the nature of the solvent and the pore-forming agents used. Gelling advantageously draws on gelling techniques used in processes for producing ultrafiltration membranes.

Gelling of cellulosic solutions does not of itself constitute a novel process, as has been seen above. The importance of "analogous" gelling on cellulosic solutions charged with pore-forming agents when preparing the alveolar cellulosic materials was not obvious, however.

The final principal step in the process of the invention consists of treating the gelled dough with the aim:

firstly of precipitating the major portion or all of the cellulose dissolved in the solvent; and secondly of causing the pore-forming agent(s) to actuate to create the final structure of the desired alveolar cellulosic product.

The final step (carried out on the gelled dough at room temperature) generally comprises a plurality of successive or simultaneous steps one of which can cause or complete the cellulose precipitation. Thus the final step, when the solvent used consists of NMMO, includes adding water. In the same way, when the solvent employed consists of an aqueous solution of at least one strong alkaline base (advantageously a sodium hydroxide solution), said final step can comprise immersing the gelled dough obtained from the preceding steps in an acid. During that immersion, the solvent used is neutralized. For this reason, either a mineral acid such as hydrochloric acid, hypochlorous acid, sulfuric acid, nitric acid, phosphoric acid, hypophosphoric acid, fluoric acid, bromic acid, or an organic acid such as formic acid, acetic acid, citric acid or oxalic acid can be used. Advantageously, a strong acid is used, in a concentration of 10 g/l to 100 g/l, at a temperature in the range +10° C. to +100° C., for a period of 5 minutes to 8 hours. Particularly preferably, sulfuric acid is used. The temperature is not particularly critical, except in the case where such acidification must simultaneously cause fusion of the pore-forming agent(s). In that case, the treatment temperature must be higher than the fusion temperature of the agent(s). Acidification can also cause certain types of pore-forming agent to decompose, in particular those which decompose under the action of an acid to form a gas, for example carbonates.

Prior to or parallel with such a decisive step, the gelled mass can undergo other treatments. Thus when the solvent consists of an aqueous solution of at least one strong alkaline base, the final step advantageously consists of immersing the gelled dough in water at a temperature in the range +40° C. to +100° C. for a period of 5 minutes to 8 hours followed by immersing in an acid, advantageously a strong acid, as described above. More generally, immersion in an acid, advantageously a strong acid, can be preceded by one and/or the other of the following steps:

raising the temperature of the gelled dough without direct contact with a heat transfer fluid: for example, in an oven, using microwaves, high frequency, using infrared, or by the Joule effect acting directly in the mass. Raising the temperature has the aim either of precipitating the dissolved cellulose, or of melting the pore-forming agent(s) to create the pores. If the cellulose is to be precipitated, the temperature must be raised to over 60° C., preferably to over 70° C. If the pore-forming agent(s) are to be melted, the temperature must be raised above the melting point thereof. Of course, depending on the pore-forming agent(s) used, it is possible to cause simultaneous precipitation of the cellulose and fusion of the pore-forming agent(s). The duration of such a treatment by raising the temperature depends on the desired aim and the other steps in the final treatment. It can be between 5 minutes and 12 hours;

hot or cold water treatment: the gelled dough can be treated with water by immersion or spraying. This treatment may be aimed either at precipitating the cellulose by washing the solvent, or by dissolving the pore-forming agent(s) to create the pores (or both). These two effects can be combined with a thermal effect analogous to that described in the preceding paragraph when hot water is used. The temperature and duration of the treatment are adapted to the formulation of the dough and to the desired effect;

treatment by an aqueous saline or slightly basic solution: the gelled dough can be treated with an aqueous saline or slightly basic solution.

The term "aqueous saline solution" means an aqueous solution of a soluble salt, for example a Li, Na, K, Mg, Ca, Al, Mn, Fe, Co, Ni, Cu or Sn type metal salt. The counter-ion can be selected from $Cl^-$, $Br^-$, $F^-$, $I^-$, $SO_4^{2-}$, $NO_3^-$, $CO_3^-$, $CH_3COO^-$, $PO_4^{3-}$, etc. . . . .

The term "slightly basic aqueous solution" means a basic aqueous solution equivalent to an aqueous sodium hydroxide solution with a concentration of less than 2% by weight. Treatment with an aqueous saline or slightly basic solution can, like the water treatment, be aimed at precipitating the dissolved cellulose by washing the solvent and/or at dissolving or melting the pore-forming agent(s) to create the pores. These effects can be combined with a thermal effect when the aqueous solution is hot. The effect of such a treatment is also reinforced by the presence of ionic species in solution which can cause the dissolved cellulose to salt out. This mode of treatment with an aqueous or slightly basic saline solution is particularly suited to an industrial process as it enables the salt and the sodium hydroxide recovered from the bath to be recycled. The temperature and duration of the treatment are adapted to the formulation of the dough and to the desired effect;

extracting water by evaporation or lyophilization: the gelled dough can be treated under conditions enabling the water to be eliminated by evaporation or by sublimation. In this case, reduced pressure is preferably employed in order to reduce the temperature and avoid rapid depolymerization of the cellulose. In particular, in order to sublime the water, a temperature of less than −8° C. and a pressure of less than 6 mbar ($6 \times 10^2$ Pa) are used. The aim of extracting the water is to precipitate the cellulose by eliminating the solvent. Extracting the water can simultaneously contribute to pore creation: the departing water leaves micropores in the cellulosic phase; in addition if ice or a solid which can sublime under analogous conditions is used as the pore-forming agent, extracting the water creates the macropores. If this treatment is carried out, the conditions enabling water to be extracted are generally maintained until extraction is complete.

The last step of the process of the invention can in certain contexts be greatly simplified. Thus, in particular when the solvent consists of an aqueous solution of at least one strong alkaline base (advantageously an aqueous sodium hydroxide solution), and the only or principal pore-forming agent consists of Glauber's salt ($Na_2SO_4$, $10H_2O$), the final step can consist of simply rinsing with water. Rinsing is advantageously carried out firstly with hot water (for example in a bath at 90° C. for one hour) then secondly with cold water (for example in at least one bath at room temperature).

Whatever the variation, this step of the process of the invention has to result in precipitation of a porous mass; the pores result from fusion, sublimation, dissolution or chemical decomposition of the pore-forming agents present.

At the end of this step, the alveolar cellulosic material is produced.

It generally has to be washed to eliminate all traces of chemical agents used upstream in the process. Washing is convenient as it enables the agents to be recovered and recycled.

Washing can be using water, preferably hot water, by immersion or spraying for the period required to achieve the desired degree of purity.

The alveolar cellulosic materials prepared in accordance with the process of the invention are constituted by 100% cellulose unless:
synthetic reinforcing fibers have been introduced;
or
additives intended to endow it with particular properties remain physically and/or chemically retained in the structure.

At least a portion of the cellulose constituting said materials has a crystalline structure other than that of cellulose I.

Characteristically, certain materials of the invention comprise only cellulose with a type II cellulose crystalline structure, because they have been obtained without using reinforcing fibers or because the cellulose of the added reinforcing fibers is type I cellulose converted to type II cellulose by the solvent used.

The alveolar cellulosic materials, in particular sponges, prepared using the process of the invention are characterized by:
their density;
their liquid (water) absorption capacity;
their dry wettability;
their pore structure
their tear strength.

Methods for measuring these different characteristics and the values obtained with sponges produced using the process of the invention will be described below.

Density:

The volume of a moist sponge sample was determined. The sample was oven dried to constant weight. The density of the sponge was the dry weight of the sample with respect to its volume when moist.

The density of the cellulosic sponges obtained using the process of the invention was in the range 20 kg/m$^3$ to 100 kg/m$^3$.

Water absorption capacity

A sponge was immersed in water. It was left for 5 minutes then weighed. The ratio of the weight obtained to the weight of the same sponge in the dry state was determined.

The water absorption capacity of the cellulosic sponges obtained using the process of the invention was over 10 times their dry weight.

Dry wettability

A sponge was oven dried to constant weight. The dry sponge was placed on a water surface and the time required for it to be completely wetted was measured using a chronometer.

The dry wettability of cellulosic sponges obtained using the process of the invention was less than 60 seconds.

Pore structure

Figure 1:
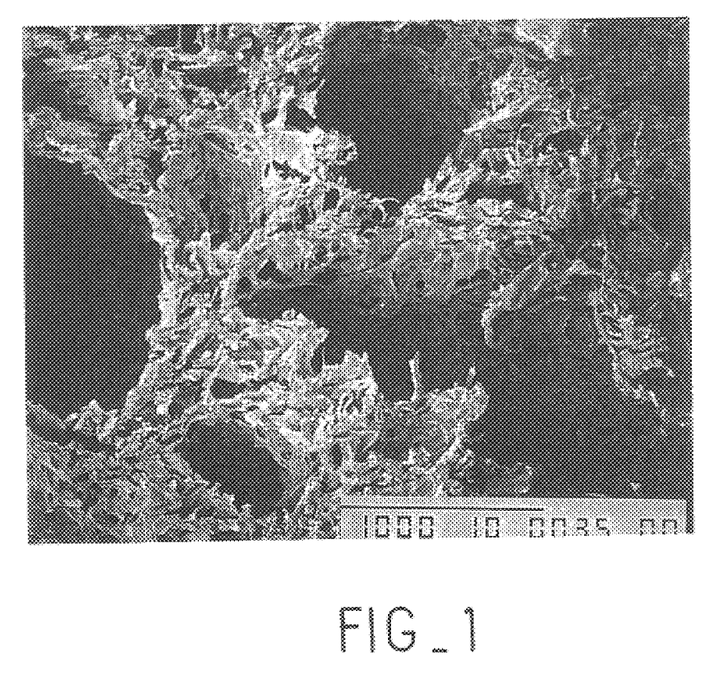
Figure 2:
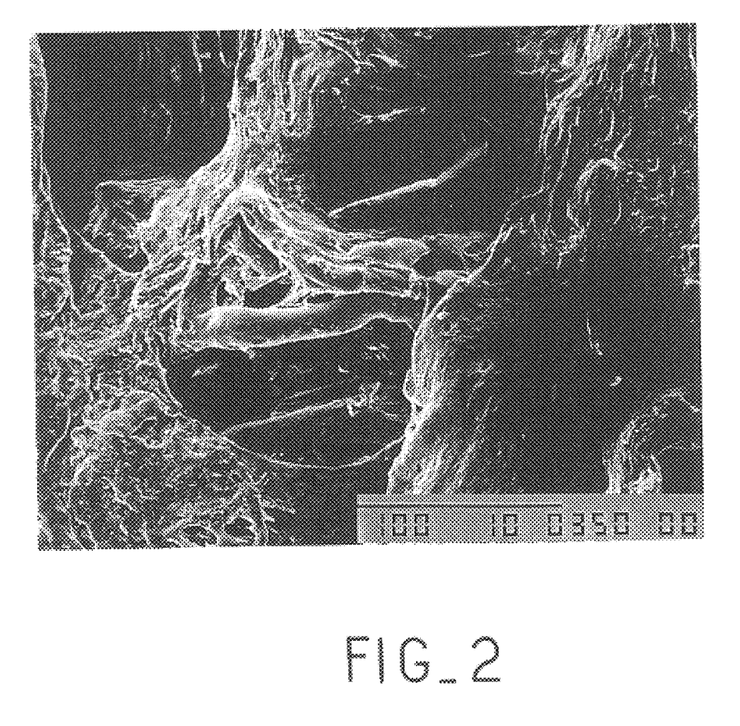
Figure 3:
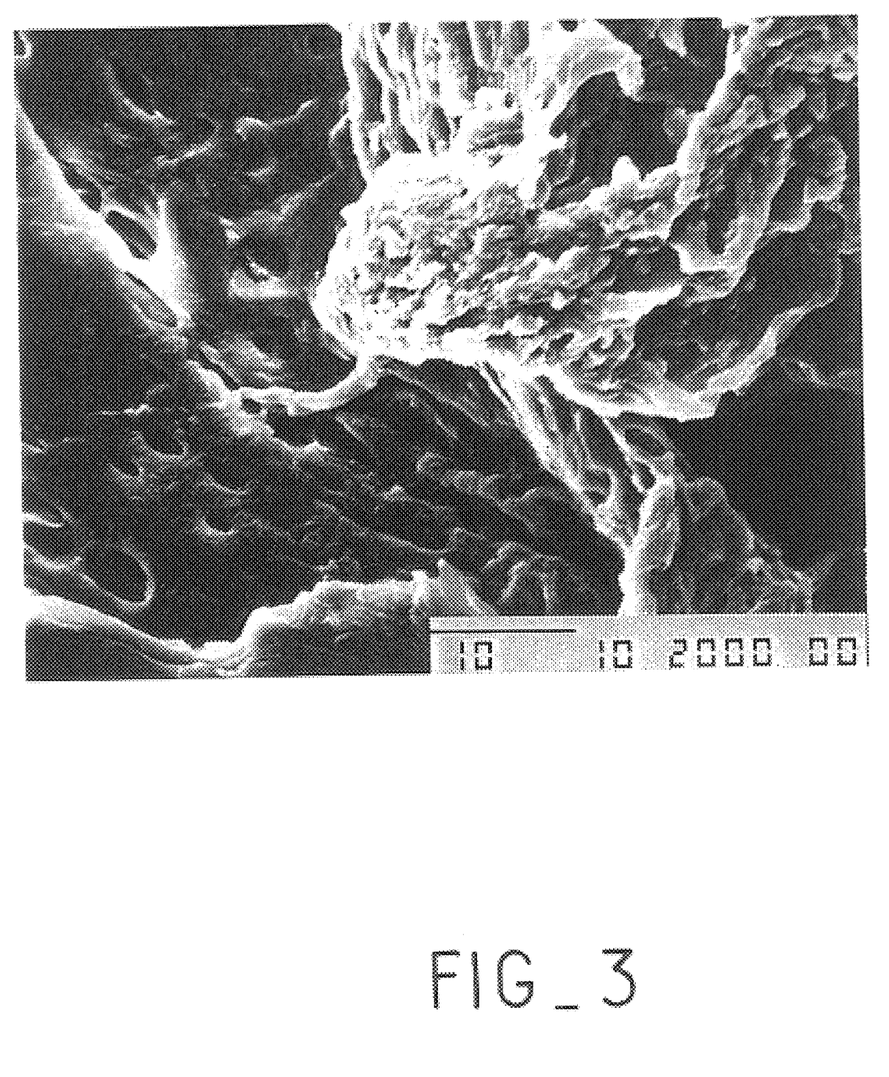

This was observed in the scanning electron microscope photographs which form the Figures which accompany the present description.

Tear strength

A moist sponge sample with a 20×50 mm (i.e., 10 cm$^2$) cross section was cut out. The tear strength was measured using a dynamometer. The tear strength of the cellulosic sponges obtained using the process of the invention was over 0.3 daN/cm$^2$. When implementing the advantageous variations of the process of the invention, cellulosic sponges with much higher tear strengths were obtained (of the order of 1 daN/cm$^2$).

Considering the data given above, the skilled person will understand that the Applicant is providing an effective process which constitutes a genuine alternative to the viscose process.

The process of the invention enables alveolar cellulosic products to be produced on an industrial scale with properties, in particular hydrophilic and liquid absorption properties, which are entirely similar to those of prior art alveolar cellulosic products obtained using the viscose process.

Said alveolar cellulosic products obtained using the process of the invention are novel per se. Thus the second objective of the present invention is constituted by alveolar cellulosic products obtainable by said process. Particularly original products from among said (novel) products are those in which all of the cellulose has a type II cellulose crystalline structure (see above).

BRIEF DESCRIPTION OF THE DRAWINGS

The present invention is illustrated in the accompanying Figures and in the Example below.

The Figures are scanning electron microscope photographs (at different magnifications) of a sponge prepared using the process of the invention prepared in accordance with the variation described in the Example below.

In FIG. 1, the magnification is ×35;
In FIG. 2, the magnification is ×350;
In FIG. 3, the magnification is ×2000.

The presence of macropores and micropores can be seen in all three Figures, in particular in FIG. 3.

EXAMPLE

The cellulosic raw material used was a dissolving wood pulp obtained by the Kraft process, sold by International Paper under the trade name Viscokraft HV. The degree of polymerization of this wood pulp was 854, measured using the viscosity of a solution in cupriethylenediamine.

The wood pulp was activated by steam explosion under the following conditions:
impregnation with distilled water for 12 hours;
pressurization in the presence of steam at 228° C. at 28 bars (28×10$^5$ Pa) for 120 seconds;
sudden depressurization by opening to air.

After this activation treatment, the degree of polymerization of the wood pulp was 422.

The solvent used in this Example was an aqueous sodium hydroxide solution containing 8% of pure sodium hydroxide.

A solution of cellulose in said aqueous sodium hydroxide solution was prepared as follows:
5% by weight of dry cellulose with respect to the weight of 8% sodium hydroxide solution was used;
the moist wood pulp was coarsely ground;
taking into account the humidity of the wood pulp, an aqueous sodium hydroxide solution was prepared such that the concentration of pure sodium hydroxide after mixing with the wood pulp was 8%;
the aqueous sodium hydroxide solution was cooled to −5° C.;
the aqueous sodium hydroxide solution was mixed with the wood pulp. The mixture was vigorously mixed for 4 hours. The temperature of the mixture was kept at −5° C. throughout the mixing period.

The cellulosic solution obtained comprised a dissolved cellulose portion and an undissolved cellulose portion. It was in fact a suspension. The solubility reached 70%.

Reinforcing fibers were then added to said suspension: 1 mm to 2 mm long cotton linters were used to this end. 2% by weight of these reinforcing fibers with respect to the total weight of the cellulose suspension was incorporated. Incorporation was achieved by blending. The temperature of the cellulosic solution thus charged (with undissolved wood pulp and reinforcing fibers) was kept at about 0° C. during blending. The charged cellulosic solution was then left to stand for 1 hour 30 minutes.

Said cellulose suspension comprising said reinforcing fibers was then mixed with a pore-forming agent formulation.

The pore-forming agent formulation comprised the following two ingredients:

the principal pore-forming agent was sodium sulfate decahydrate $Na_2SO_4, 10H_2O$. It was used in crystalline form. The diameter distribution of the crystals used was in the range 100 μm to 3 mm. 250% by weight of sodium sulfate decahydrate with respect to the weight of charged cellulosic solution was used;

sodium lauryl sulfate was used to cause the cellulosic solution to swell slightly and to regulate the micropore size. 0.5% by weight of Neopon® with respect to the weight of charged cellulosic solution was used.

The pore-forming formulation was mixed with the cellulose suspension charged with reinforcing fibers by blending until a homogeneous dough was obtained. The temperature during blending was kept below 10° C.

The sponge dough thus obtained was poured into a parallelepipedal shaped mold with 10 cm by 15 cm sides. It was then slowly cooled to a temperature of −20° C., kept at that temperature for 24 hours then brought back to room temperature in the form of the expected gel.

At the end of the gelling step, the dough constituted a solid gel with good cohesion which could be unmolded without deforming.

Finally, the dissolved cellulose was caused to precipitate and the sodium sulfate was caused to melt by a treatment carried out in two successive baths:

hot water at 90° C. for 1 hour;
cold water (−20° C.) for 8 hours.

The appearance of the sponge obtained was very close to that of the sponge-viscose: a surface skin was present; the pores were clearly visible and well formed. It had dimensions which were slightly smaller than the dimensions of the mold. It was flexible and elastic when moist. It shrank and became hard on drying. It re-wetted almost instantaneously when dry.

It had the following characteristics:

| | |
|---|---|
| density (moist): | 35 kg/m³ (35 g/dm³); |
| water absorption: | 17 times its own weight; |
| tear strength: | 0.6 daN/cm². |

What is claimed is:

1. A process for producing alveolar cellulosic products of the sponge, sponge-cloth type, from cellulose, characterized in that it comprises:

at least partially dissolving said cellulose in an intrinsic solvent for cellulose;

incorporating an effective quantity of at least one pore-forming agent into the resulting mixture, with mixing; said pore-forming agent(s), which is/are compatible with the cellulose mixture, being capable of generating macro- and micropores when it/they is/are actuated;

gelling the homogeneous dough thus obtained;

treating said gelled dough under conditions in which the dissolved cellulose precipitates out and the pore-forming agent(s) present are actuated.

2. A process according to claim 1, characterized in that said cellulose includes cellulose with a type I cellulose and/or type II cellulose crystalline structure, and of which the average viscosimetric degree of polymerization is over 100.

3. The process of claim 2 wherein said average viscosimetric degree of polymerization is in the range 200 to 1000.

4. A process according to claim 1, characterized in that it comprises an activation treatment for said cellulose carried out prior to said at least partial dissolution of said cellulose.

5. The process of claim 4 wherein said activation treatment is a steam explosion or a microfibrillation technique.

6. A process according to claim 1, characterized in that 3% to 15% by weight of said cellulose is added to said solvent in order to obtain said at least partial dissolution of said cellulose in said intrinsic solvent for cellulose.

7. A process according to claim 1, characterized in that said cellulose is at least partially dissolved in an aqueous solution of at least one strong alkaline base.

8. A process according to claim 7, characterized in that said dissolution is carried out at a temperature in the range −15° C. to +10° C., in a solution comprising 5% to 12% by weight of said strong base(s).

9. A process according to claim 7, characterized in that the homogeneous dough is gelled at a temperature in the range −30° C. to +90° C. for a period of one hour to 400 hours.

10. The process of claim 9 wherein said homogenous dough is formed before its gelling.

11. A process according to claim 7, characterized in that the treatment of the gelled mass comprises immersing said mass in an acid solution or rinsing it with water.

12. The process of claim 7 wherein said aqueous solution of at least one strong alkaline base is an aqueous sodium hydroxide solution.

13. A process according to claim 1, characterized in that it comprises incorporating, as a pore-forming agent, at least one solid in the form of particles with a granulometry in the range 10 μm to 50 mm; the solid being actuated by fusion, sublimation, dissolution or chemical decomposition.

14. The process of claim 13 wherein said granulometry is in the range 100 μm to 15 mm.

15. A process according to claim 1, characterized in that it comprises incorporating, as a pore-forming agent, at least one compound selected from:

solids which are soluble in the cellulose mixture or insoluble therein and thus have a granulometry of less than 100 μm, and liquids which can liberate a gas during the subsequent steps of the process by a rise in temperature or by the action of a chemical agent;

anionic or cationic polyelectrolytes which can cause segregation of the cellulose mixture from their incorporation or during the subsequent steps of the process, by variations in temperature;

swelling agents which can cause slight foaming of the cellulose mixture.

16. A process according to claim 1, characterized in that it comprises incorporating reinforcing fibers and/or additives into the cellulose/solvent mixture and/or into the cellulose/solvent/pore-forming agent(s) dough.

* * * * *